Patented Feb. 8, 1949

2,461,069

UNITED STATES PATENT OFFICE 2,461,069

SIMULTANEOUS CATALYTIC CRACKING AND DESULFURIZATION OF HYDROCARBONS

Milton M. Marisic, Woodbury, and Arthur C. Schmitt, Wenonah, N. J., and Frederick C. Frank, Philadelphia, Pa., assignors to Socony-Vacuum Oil Company, Incorporated, a corporation of New York No Drawing. Application June 10, 1944, Serial No. 539,790

4 Claims. (Cl. 196—52)

This invention relates to a novel catalyst for conversion of hydrocarbon oil and to processes of converting hydrocarbons by contacting vapors thereof at conversion conditions of temperature and pressure with the catalyst of this invention.

Plural oxide gels of silica containing minor proportions of oxides like $Al_2O_3$, $ZrO_2$, $ThO_2$, $BeO$ and the like, are excellent hydrocarbon conversion catalysts. These catalysts are especially suitable for accelerating the cracking of heavy fractions of petroleum to produce hydrocarbons boiling in the gasoline range and to reform lighter petroleum fractions, such as naphtha, so as to increase the rate of formation of high anti-knock motor fuel. In the destructive hydrogenation of carbonaceous materials, such as middle oils, paraffin-base gas oils, etc., the gel catalysts noted above are most efficient at pressures ranging from 300 to 1000 atmospheres. Commercial equipment capable of withstanding such high pressures is extremely costly, and for this reason, these catalysts have not been used in such processes. Modification of the plural oxide gel catalysts according to the method of this invention, by inclusion of oxides of iron, permits economic operation of destructive hydrogenation processes at pressures as low as 20 atmospheres; however, considerably higher pressures may be used as, for example, 250 atmospheres, or above. Temperatures employed range from about 700° F. to about 1000° F., preferably 800° to 900° F.

The iron-containing gel catalysts of this invention have been found to be especially effective in the simultaneous cracking and desulfurization of petroleum hydrocarbons containing organic sulfur compounds at operating conditions generally employed in catalytic cracking. These gels function solely as desulfurization catalysts at temperatures lower than those used in catalytic cracking, say, below 800° F., preferably 500° to 750° F. In industry, bauxite is employed as a desulfurization catalyst; however, its efficiency for this purpose is not as high as that of the present gel catalyst. Furthermore, bauxite has practically no activity as a cracking catalyst.

The plural oxide gels of this invention are formed by mixing a sodium silicate solution of the proper concentration with an acid solution containing an acid and an iron salt, together with one or more soluble salts of aluminum, zirconium, thorium, beryllium and other difficultly reducible metal oxides. Alternatively, the metal may be supplied in the silicate solution, e. g., as sodium aluminate. The solutions are mixed under such conditions that a hydrosol forms without substantial precipitation and that this hydrosol will have a pH between 2.5 and 10, and preferably between pH 5 and 8.5. After a short period of time, as for example a few seconds, a few minutes or longer, but preferably in less than 30 minutes, the hydrosol should set to a gel. The gel thus formed is defined as a hydrogel. This hydrogel is washed, dried and heat treated according to conventional methods.

EXAMPLE I

SILICA, FERRIC OXIDE, ALUMINA GEL

94% $SiO_2$, 3% $Fe_2O_3$, 3% $Al_2O_3$ (on dry basis)

6,720 cc. of sodium silicate containing 0.210 g. $SiO_2$ per cc. (prepared by diluting "N" brand sodium silicate) was added to a well-agitated acid solution made up of 2245 cc. of 3.78 normal HCl, 1070 cc. of $Al_2(SO_4)_3$ containing 0.042 g. $Al_2O_3$ per cc., 889 cc. of $FeCl_3$ solution containing 0.05 g. $Fe_2O_3$ per cc., and 19 liters of distilled water. The resulting hydrosol set to a clear, firm gel in 25 seconds, having a pH of 7.3.

Gel prepared according to the above directions has a total oxide concentration, based on the weight of freshly formed hydrogel, of 5%, of which 94% is $SiO_2$, 3% $Fe_2O_3$ and 3% $Al_2O_3$.

The hydrogel thus obtained was broken up, partially dehydrated to 50% of its original water content at 180° F., and washed free of soluble salts by decantation with distilled water. It was then substantially freed of sodium ion by base exchanging for a suitable period of time in 5% ammonium chloride solution. The gel was finally water washed free of chloride ions and dried, the temperature being gradually raised to 1050° F., at which it was activated for five hours, prior to testing as a cracking catalyst.

EXAMPLE II

SILICA, FERRIC OXIDE, ALUMINA GEL

90% $SiO_2$, 3% $Fe_2O_3$, 7% $Al_2O_3$ (on dry basis)

7,140 cc. of sodium silicate (of the same concentration used in Example I) was mixed with 4,940 cc. of sodium-aluminate solution containing 0.0236 g. Al$_2$O$_3$ per cc. The resulting alkaline solution was added with rapid stirring to an acid solution comprising 3,470 cc. of 3.78 normal HCl, 1000 cc. FeCl$_3$ solution containing 0.05 g. Fe$_2$O$_3$ per cc., and 7.5 liters of distilled water. The resulting hydrosol set to a clear, firm gel in 20 seconds having a pH of 6.8.

Gel prepared according to the above directions has a total oxide concentration, based on the weight of freshly-formed hydrogel of 7%, of which 90% is SiO$_2$, 3% Fe$_2$O$_3$, and 7% Al$_2$O$_3$.

The hydrogel was partially dried, washed and finally dried, as described in Example I. Analysis of the dried gel showed a sodium content of 0.02%.

EXAMPLE III

SILICA, FERRIC OXIDE, ALUMINA GEL 88.4% SiO$_2$, 2.95% Fe$_2$O$_3$, 6.9% Al$_2$O$_3$, 1.75% Na$_2$O (on dry basis)

This gel was prepared exactly as described in Example II, except that in the washing process, sodium ions were not removed by base exchange with ammonium chloride.

Analysis of the dried gel showed a sodium content of 1.3%.

EXAMPLE IV

SILICA-ALUMINA IRON OXIDE GEL 96.5% SiO$_2$, 3% Al$_2$O$_3$, 0.5% Fe$_2$O$_3$ (on dry basis)

This gel was prepared from the following reagents according to the method described in Example I.

FeCl$_3$ solution (0.03 g. Fe$_2$O$_3$ per cc.)___cc__ 300
Al$_2$(SO$_4$)$_3$ solution (0.042 g. Al$_2$O$_3$ per cc.) cc__ 1286
3.78 normal hydrochloric acid_____cc__ 3400
Sodium silicate solution (0.210 g. SiO$_2$ per cc.) _____cc__ 8280
Distilled water _____liters__ 16

This gel had a gelation time of 75 seconds and a pH of 6.2.

EXAMPLE V

SILICA-ALUMINA IRON OXIDE GEL 94.5% SiO$_2$, 5% Al$_2$O$_3$, 0.5% Fe$_2$O$_3$ (dry basis)

The gel of this example was prepared from the following reagents according to the method described in Example I.

FeCl$_3$ solution (0.05 g. Fe$_2$O$_3$ per cc.)__cc__ 150
3.78 normal hydrochloric acid_____cc__ 2138
Al$_2$(SO$_4$)$_3$ solution (0.042 g. Al$_2$O$_3$ per cc.) cc__ 1785
Sodium silicate solution (0.210 g. SiO$_2$ per cc.) _____cc__ 6750
Distilled water _____liters__ 19

The gelation time was 45 seconds, while the pH of the hydrosol was 7.2.

EXAMPLE VI

SILICA-ALUMINA IRON OXIDE GEL 92.5% SiO$_2$, 7% Al$_2$O$_3$, 0.5% Fe$_2$O$_3$ (on dry basis)

The gel in this instance was prepared from the following reagents according to the method described in Example I.

FeCl$_3$ solution (0.05 g. Fe$_2$O$_3$ per cc.)___cc__ 120
3.78 normal hydrochloric acid _____cc__ 1140
Al$_2$(SO$_4$)$_3$ solution (0.042 g. Al$_2$O$_3$ per cc.) cc__ 2000
Sodium silicate solution (0.210 g. SiO$_2$ per cc.) _____cc__ 5285
Distilled water _____liters__ 21

The gelation time was 40 seconds, while the pH of the hydrosol was 8.

EXAMPLE VII

SILICA-ALUMINA IRON OXIDE GEL

92% SiO$_2$, 5% Al$_2$O$_3$, 3% Fe$_2$O$_3$ (on dry basis)

The gel was prepared from the following reagents according to the method described in Example I.

FeCl$_3$ solution (0.05 g. Fe$_2$O$_3$ per cc.)___cc__ 481
3.78 normal hydrochloric acid_____cc__ 845
Al$_2$(SO$_4$)$_3$ solution (0.042 g. Al$_2$O$_3$ per cc.) cc__ 950
Sodium silicate solution (0.210 g. SiO$_2$ per cc.) _____cc__ 3500
Distilled water _____liters__ 14

The gelation time was 80 seconds, while the pH of the hydrosol was 7.1.

The catalysts described in the above examples were tested in the cracking of a fraction of Oklahoma City gas oil having a boiling range from 470° F. to 708° F. The oil vapors were conducted through the catalyst bed at 800° F. and at a liquid space velocity of 1.5 for 20-minute periods between regenerations. The cracking activity of these catalysts is shown in Table 1. Cracking activity is defined as the volume per cent conversion of the oil charged to 410° F. endpoint gasoline.

TABLE 1

| Catalyst of Example No. | Catalyst Composition (on dry basis) | | | | Activity |
|---|---|---|---|---|---|
| | Per cent SiO$_2$ | Per cent Al$_2$O$_3$ | Per cent Fe$_2$O$_3$ | Per cent Na$_2$O | |
| I | 94 | 3 | 3 | ---------- | 41 |
| II | 90 | 7 | 3 | ---------- | 46 |
| III | 88.4 | 6.9 | 2.95 | 1.75 | 5 |
| IV | 96.5 | 3 | 0.5 | ---------- | 43 |
| V | 94.5 | 5 | 0.5 | ---------- | 45 |
| VI | 92.5 | 7 | 0.5 | ---------- | 47 |
| VII | 92 | 5 | 3 | ---------- | 47 |

The above-described catalysts were tested in the simultaneous cracking and desulfurization of Slaughter-Duggan gas oil having a boiling range of 398° to 748° F. This gas oil contained 1.65% sulfur in the form of organic sulfur compounds. The oil vapors were conducted through the catalyst chamber at 810° F. and at a liquid space velocity of 1.5 for 20-minute periods between regenerations. Data for the cracking activity and the desulfurization efficiency are presented in Table 2:

TABLE 2

| Catalyst of Example No. | Percent Vol. Conversion to 410° F. E. P. Gasoline | Percent Weight Sulfur | | |
|---|---|---|---|---|
| | | in Gasoline | in Recycle Stock | Removal from Charge |
| I | 25 | 0.22 | 1.15 | 62.5 |
| II | 28 | 0.25 | 1.13 | 64.3 |
| III | 14 | 0.38 | 1.11 | 51.2 |
| IV | 39 | 0.18 | 1.24 | 59.8 |
| V | 45 | 0.14 | 1.27 | 62.9 |
| VI | 42 | 0.11 | 1.27 | 64.3 |
| VII | 28 | 0.13 | 1.02 | 71.5 |

It is to be noted in Table 2 that catalysts V and VI, which are best as cracking catalysts for this oil, are also good desulfurization catalysts. Increasing the iron oxide content of catalyst V to 3% as exemplified by catalyst VII, reduces the cracking activity but improves the desulfurization efficiency. Increase in iron oxide content of catalyst VI to 3% as shown by catalyst II has no effect on the total desulfurization but reduces the extent of cracking. Therefore, for processes requiring simultaneous cracking and resulfurization, catalysts V and VI are preferred over catalysts II and VII; however, the latter catalysts would be better when only desulfurization is desired. For, in this case, the cracking capacity of catalysts II and VII could be eliminated by a smaller lowering in temperature than would be necessary with catalysts V and VI.

Table 3 compares the desulfurization efficiency of bauxite and the catalysts of Example IV employing Slaughter-Duggan gas oil previously described. The desulfurizations were conducted at a liquid space velocity of 1.2 for one-hour periods between regenerations at the temperatures noted below. Steam and $CO_2$ were used to aid in the vaporization and in the maintenance of the charge oil in the vapor state.

TABLE 3

| Catalyst | Temp., °F. | Entrainer | Per Cent Wt. Sulfur in Converted Oil |
|---|---|---|---|
| Bauxite | 650 | Steam+$CO_2$ | 1.49 |
| Example IV | 650 | do | 0.75 |
| Bauxite | 750 | do | 1.28 |
| Example IV | 750 | do | 1.01 |
| Bauxite | 750 | $CO_2$ | 1.10 |
| Example IV | 750 | do | 1.03 |
| Example IV [1] | 600 | do | 0.75 |

[1] Liquid space velocity=0.5; time of run=1 hour.

Preferably, the catalyst contains about 75 to 97% $SiO_2$, 0.05 to 15% $Al_2O_3$ (or other difficultly reducible oxide) and 0.2 to 20% $Fe_2O_3$ (by weight).

A composite batch of the catalysts described in Examples II and VII was tested for activity in promoting both the destructive hydrogenation and cracking of a fraction of Oklahoma City gas oil, having a boiling range from 470° to 708° F. Experiments were carried out under similar conditions so as to provide comparable results. The oil vapors were conducted through the catalyst bed at 810° F. and at a liquid space velocity of 1.5 for one-hour periods between regenerations. The results are summarized in Table 4.

TABLE 4

| | Per Cent Vol. Conversion to 410° F. E. P. Gaso. | Per Cent Wt. Coke Formed | Per Cent Vol. Liq. Recovery |
|---|---|---|---|
| Cracking Conditions (Atmos. Pr.) | 23 (28% olefins) | 6.4 | 84 |
| Destructive Hydrogenation (20 Atm. of $H_2$ Pr.) | 36 (9% olefins) | 3.4 | 91 |

It is to be noted that destructive hydrogenation conditions increase both the recovery and conversion, while at the same time, the coke formation is reduced. The olefin content of the resulting gasoline is also markedly decreased in the hydrogenation run.

We claim:

1. A process for simultaneous cracking and desulfurization of a high sulfur-content petroleum hydrocarbon stock, which includes the step of contacting vapors of said stock, in the absence of hydrogen, at catalytic cracking conditions of temperature and pressure with a three-component dried synthetic gel type catalyst consisting of a major proportion of silica, a minor proportion of alumina and approximately 0.5 per cent by weight of ferric oxide.

2. A process for simultaneous cracking and desulfurization of a high sulfur-content petroleum hydrocarbon stock, which includes the step of contacting vapors of said stock, in the absence of hydrogen, at catalytic cracking conditions of temperature and pressure with a three-component dried synthetic gel type catalyst consisting of about 94.5 per cent silica, about 5 per cent alumina and about 0.5 per cent by weight of ferric oxide.

3. A process for simultaneous cracking and desulfurization of a high sulfur-content petroleum hydrocarbon stock, which includes the step of contacting vapors of said stock, in the absence of hydrogen, at catalytic cracking conditions of temperature and pressure with a three-component dried synthetic gel type catalyst consisting of about 92.5 per cent silica, about 7 per cent alumina and about 0.5 per cent by weight of ferric oxide.

4. A process for simultaneous cracking and desulfurization of a high sulfur-content petroleum hydrocarbon stock, which includes the step of contacting vapors of said stock, in the absence of hydrogen, at catalytic cracking conditions of temperature and pressure with a three-component dried synthetic gel type catalyst consisting of about 96.5 per cent silica, about 3 per cent alumina and about 0.5 per cent by weight of ferric oxide.

MILTON M. MARISIC.
ARTHUR C. SCHMITT.
FREDERICK C. FRANK.

REFERENCES CITED

The following references are of record in the file of this patent:

UNITED STATES PATENTS

| Number | Name | Date |
|---|---|---|
| 2,121,046 | Pew, Jr. | June 21, 1938 |
| 2,126,503 | Retailliau et al. | Aug. 9, 1938 |
| 2,324,066 | Connolly | July 13, 1943 |
| 2,347,216 | Peterkin | Apr. 25, 1944 |
| 2,348,576 | Seguy | May 9, 1944 |
| 2,355,388 | Michael et al. | Aug. 8, 1944 |

FOREIGN PATENTS

| Number | Country | Date |
|---|---|---|
| 504,614 | Great Britain | Apr. 24, 1939 |

Certificate of Correction

Patent No. 2,461,069.

February 8, 1949.

MILTON M. MARISIC ET AL.

It is hereby certified that errors appear in the printed specification of the above numbered patent requiring correction as follows:

Column 2, line 24, Example 1, before the word "containing" insert *solution*; column 5, line 5, for "resulfurization" read *desulfurization*; and that the said Letters Patent should be read with these corrections therein that the same may conform to the record of the case in the Patent Office.

Signed and sealed this 28th day of June, A. D. 1949.

[SEAL]

THOMAS F. MURPHY,
*Assistant Commissioner of Patents.*